US010612590B2

(12) United States Patent
Neufeld et al.

(10) Patent No.: US 10,612,590 B2
(45) Date of Patent: Apr. 7, 2020

(54) BUOYANCY-ENHANCED HELICAL LOOP DRIVE SYSTEM

(71) Applicant: New-Field Energy, LLC, Waynesboro, VA (US)

(72) Inventors: Norman Raymond Neufeld, Waynesboro, VA (US); Clifton E. Scott, Waynesboro, VA (US)

(73) Assignee: New-Field Energy, LLC, Waynesboro, VA (US)

( * ) Notice: Subject to any disclaimer, the term of this patent is extended or adjusted under 35 U.S.C. 154(b) by 0 days.

(21) Appl. No.: 16/252,019

(22) Filed: Jan. 18, 2019

(65) Prior Publication Data
US 2019/0226524 A1  Jul. 25, 2019

Related U.S. Application Data

(60) Provisional application No. 62/621,250, filed on Jan. 24, 2018.

(51) Int. Cl.
*F16C 29/06* (2006.01)
*F16J 15/16* (2006.01)
(Continued)

(52) U.S. Cl.
CPC ............ *F16C 29/0638* (2013.01); *B63G 8/22* (2013.01); *F03B 17/04* (2013.01);
(Continued)

(58) Field of Classification Search
CPC .............. F16C 29/0604; F16C 29/0609; F16C 29/0638; F16J 15/16; F03B 17/04; F03B 17/065; E06B 9/326
(Continued)

(56) References Cited

U.S. PATENT DOCUMENTS 1,070,973 A      8/1913  Wilbur
1,708,807 A  *  4/1929  Tatay ..................... A63H 33/00
                                                      40/440
(Continued)

FOREIGN PATENT DOCUMENTS

CN       201420804 Y    3/2010
EP         1337361 B1   2/2004
(Continued)

OTHER PUBLICATIONS

International Search Report and Written Opinion, dated Apr. 22, 2019, for related International application No. PCT/US2019/014477 (13 pgs).

*Primary Examiner* — Marcus Charles
(74) *Attorney, Agent, or Firm* — Armstrong Teasdale LLP

(57) ABSTRACT

A buoyancy-enhanced loop drive system includes upper and lower gears, a helical drive loop extending around and rotatably engaging the upper and lower gears, and a tank configured to retain a liquid medium. An ascending side of the drive loop extends through the tank. In some embodiments, the drive loop includes a plurality of sections, and adjacent sections are rotatable with respect to each other about an axis normal to an end face of the sections. Additionally or alternatively, the ascending side of the drive loop advances through an inlet seal via an exit port defined in an exit wall oriented perpendicular to the exit direction. Additionally or alternatively, an intermediate plate is coupled to an inlet housing for rotation about a vertical axis, and to a stationary support structure for bi-directional translation.

18 Claims, 11 Drawing Sheets

(51) Int. Cl.
*B63G 8/22* (2006.01)
*F03B 17/04* (2006.01)

(52) U.S. Cl.
CPC ...... *F16C 29/0604* (2013.01); *F16C 29/0609* (2013.01); *F16C 29/0678* (2013.01); *F16J 15/16* (2013.01)

(58) Field of Classification Search
USPC .......... 384/44, 58, 94, 451; 24/663; 60/496, 60/504; 160/321; 415/5, 7
See application file for complete search history.

(56) References Cited

U.S. PATENT DOCUMENTS

| | | | |
|---|---|---|---|
| 3,362,150 A * | 1/1968 | Paquette | D02G 1/00 57/282 |
| 3,838,897 A | 10/1974 | Zeldman | |
| 4,273,031 A | 6/1981 | Hannon | |
| 4,325,216 A * | 4/1982 | Mermis | F03B 17/02 60/496 |
| 4,463,992 A | 8/1984 | Heine | |
| 4,533,067 A | 8/1985 | Sansevero, Jr. et al. | |
| 4,718,232 A * | 1/1988 | Willmouth | F03B 17/04 290/1 R |
| 4,724,706 A | 2/1988 | Stiever | |
| 4,844,624 A | 7/1989 | Teramachi | |
| 5,031,547 A | 7/1991 | Hirose | |
| 6,305,165 B1 | 10/2001 | Mizuki, Sr. | |
| 7,434,396 B2 | 10/2008 | McGahee | |
| 7,472,939 B2 | 1/2009 | Tores | |
| 7,513,733 B2 * | 4/2009 | Dentler | F03B 17/04 415/5 |
| 8,042,334 B2 * | 10/2011 | Ribeiro | F03B 17/04 290/1 R |
| 8,141,448 B2 | 3/2012 | Watanabe et al. | |
| 8,456,027 B1 * | 6/2013 | Seehorn | H02K 7/1823 290/1 R |
| 8,757,024 B2 | 6/2014 | Anderson et al. | |
| 8,898,871 B2 * | 12/2014 | Nakamura | E06B 9/326 160/173 R |
| 9,151,109 B2 * | 10/2015 | Kawai | E06B 9/262 |
| 9,267,489 B2 * | 2/2016 | Kim | F03B 17/00 |
| 9,388,889 B2 | 7/2016 | Chen et al. | |
| 9,488,255 B2 | 11/2016 | Ishizaki et al. | |
| 9,625,017 B2 | 4/2017 | Chen et al. | |
| 2007/0066431 A1 | 3/2007 | Hironaka | |
| 2007/0283689 A1 | 12/2007 | McGahee | |
| 2010/0139054 A1 * | 6/2010 | Gommel | H04R 25/652 24/304 |
| 2011/0194895 A1 * | 8/2011 | Lai | E06B 9/326 403/361 |

FOREIGN PATENT DOCUMENTS

| | | |
|---|---|---|
| JP | H07332452 A | 12/1995 |
| WO | 8101175 A1 | 4/1981 |
| WO | 2016024683 A1 | 2/2016 |

* cited by examiner

BUOYANCY-ENHANCED HELICAL LOOP DRIVE SYSTEM

CROSS REFERENCE TO RELATED APPLICATIONS

This application claims the benefit of and priority to U.S. Provisional Patent Application Ser. No. 62/621,250 filed Jan. 24, 2018, entitled "BUOYANCY-ENHANCED HELICAL LOOP DRIVE SYSTEM", the disclosure of which is hereby incorporated by reference in its entirety.

BACKGROUND

The field of the disclosure relates generally to loop drive systems used, for example, in power transmission systems and, more particularly, to a system for reducing energy loss in loop drive mechanisms via buoyancy.

At least some known loop drive systems include a pair of vertically spaced gears and a drive loop, such as a chain or other endless flexible member, extending around the gears such that kinetic energy of one of the gears is transferable to the other gear. At least some such systems, such as but not limited to those with large vertical displacements between the gears, experience energy loss due to a weight of the drive loop. Such energy loss is reduced in at least some known systems by forming the drive loop from a material less dense than water, and routing the upward-traveling side of the drive loop through a water-filled tank to take advantage of a resulting buoyancy force on the drive loop. However, at least some such systems have been limited in effectiveness due to energy loss through kinetic friction at the entry point of the drive loop into the tank, which must be sealed against leakage. Additionally, at least some such known systems have been limited in effectiveness due to energy loss through kinetic friction at contact points between the drive loop and the gears.

BRIEF DESCRIPTION

In one aspect, a buoyancy-enhanced helical loop drive system is provided. The buoyancy-enhanced helical loop drive system includes an upper gear, a lower gear, a stationary support structure configured to support the upper gear and the lower gear for rotation with respect to the stationary support structure, and a drive loop extending in a closed loop around the upper gear and the lower gear and rotatably engaging the upper gear and the lower gear. The drive loop includes a plurality of sections coupled together serially and defining a helical shape. Each of the plurality of sections extends from a male end to an opposite female end. The female end includes an end face. The buoyancy-enhanced helical loop drive system also includes a tank configured to retain a liquid medium. The tank includes a lower end and an opposite upper end. An ascending side of the drive loop extends through the tank from the lower end to the upper end. The male end of each of the plurality of sections is configured to couple to the female end of an adjacent one of the plurality of sections in a face-to-face relationship, such that the adjacent sections are rotatable with respect to each other about an axis normal to the end face of the female end.

In another aspect, a buoyancy-enhanced helical loop drive system is provided. The buoyancy-enhanced helical loop drive system includes an upper gear, a lower gear, a stationary support structure configured to support the upper gear and the lower gear for rotation with respect to the stationary support structure, and a drive loop extending in a closed loop around the upper gear and the lower gear and rotatably engaging the upper gear and the lower gear. The drive loop defines a helical shape. The buoyancy-enhanced helical loop drive system also includes a tank configured to retain a liquid medium. The tank includes a lower end and an opposite upper end. An ascending side of the drive loop extends through the tank from the lower end to the upper end. The buoyancy-enhanced helical loop drive system also includes an inlet housing coupled to the lower end of the tank. The inlet housing is rotatable about a vertical axis with respect to the stationary support structure. The inlet housing includes an inlet seal including an exit wall and an exit port defined in the exit wall. The ascending side of the drive loop is receivable from beneath the inlet housing, through the inlet seal, through the exit port, and into the tank. The ascending side of the drive loop advances through the exit port in an exit direction, and the exit wall is oriented perpendicular to the exit direction.

In another aspect, a buoyancy-enhanced helical loop drive system is provided. The buoyancy-enhanced helical loop drive system includes an upper gear, a lower gear, a stationary support structure configured to support the upper gear and the lower gear for rotation with respect to the stationary support structure, and a drive loop extending in a closed loop around the upper gear and the lower gear and rotatably engaging the upper gear and the lower gear. The drive loop defines a helical shape. The buoyancy-enhanced helical loop drive system also includes a tank configured to retain a liquid medium. The tank includes a lower end and an opposite upper end. An ascending side of the drive loop extends through the tank from the lower end to the upper end. The buoyancy-enhanced helical loop drive system also includes an inlet housing fixedly coupled to the lower end of the tank. The inlet housing is rotatable about a vertical axis with respect to the stationary support structure. The inlet housing includes an inlet seal. The ascending side of the drive loop is receivable from beneath the inlet housing, through the inlet seal, and into the tank. The buoyancy-enhanced helical loop drive system further includes an intermediate plate coupled to the stationary support structure for bi-directional translation with respect to the stationary support structure. The intermediate plate is coupled to the inlet housing such that the inlet housing is rotatable about the vertical axis with respect to the intermediate plate.

The features, functions, and advantages described herein may be achieved independently in various embodiments of the present disclosure or may be combined in yet other embodiments, further details of which may be seen with reference to the following description and drawings.

DETAILED DESCRIPTION

The embodiments described herein include a helical drive loop extending around and rotatably engaging upper and lower gears, and a tank configured to retain a liquid medium. An ascending side of the drive loop extends through the tank. A density of the drive loop is less than a density of the liquid medium, resulting in a buoyant force on the ascending side of the drive loop that improves a performance of the loop drive system. In some embodiments, the drive loop includes a plurality of sections, and adjacent sections are rotatable with respect to each other about an axis normal to an end face of the sections. Additionally or alternatively, the ascending side of the drive loop advances through an inlet seal at the lower end of the tank via an exit port defined in an exit wall oriented perpendicular to the exit direction. Additionally or alternatively, an intermediate plate is coupled to an inlet housing at the lower end of the tank for rotation about a vertical axis, and to a stationary support structure for bi-directional translation. Additionally or alternatively, the system includes dual drive loops arranged in a double helix, resulting in increased performance for a system having the same footprint as a single drive loop system. Additionally or alternatively, the tank has a cooperating helical shape, reducing an area and magnitude of potential leakage of the liquid medium from the tank.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
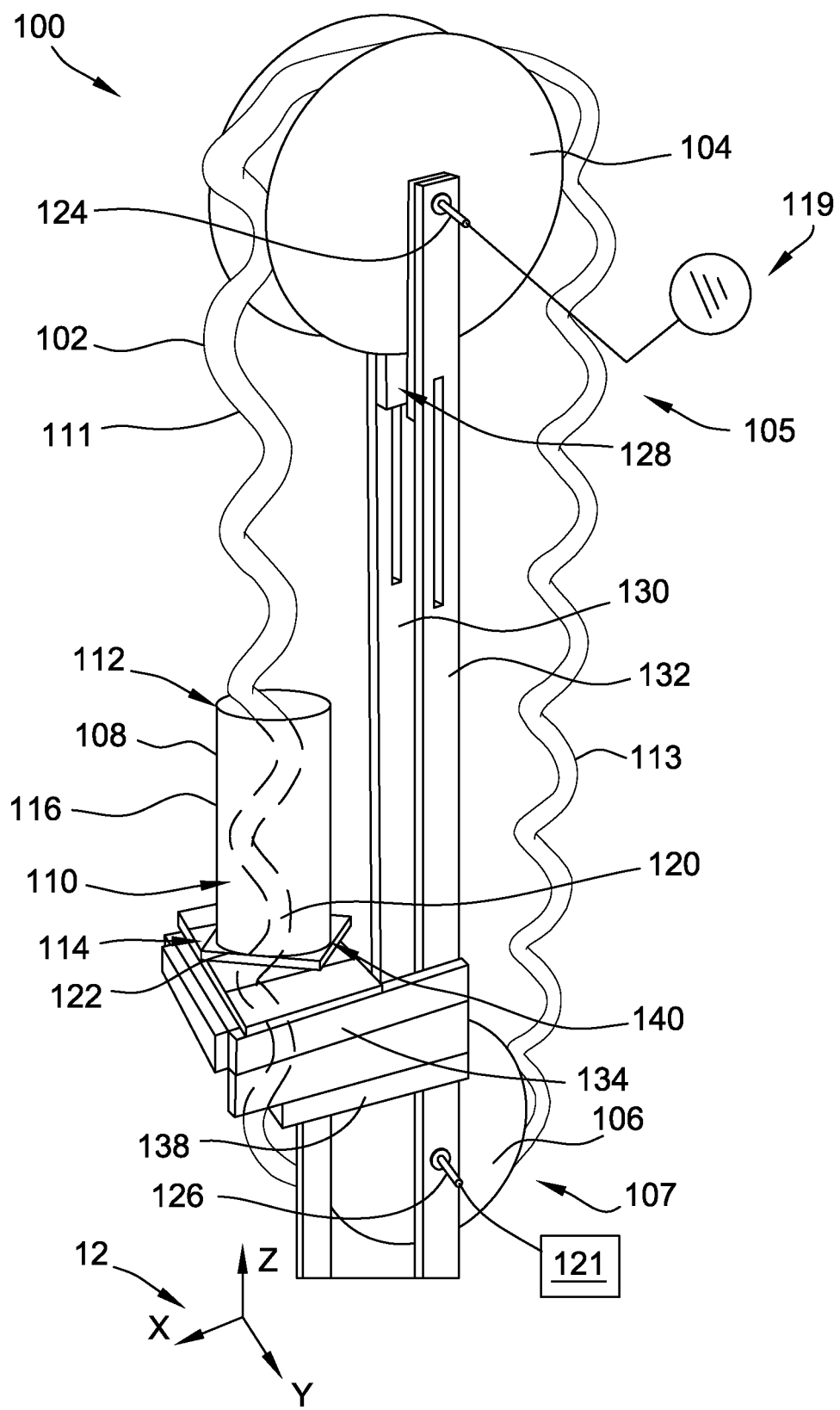
FIG. 1 is a schematic perspective view of an exemplary loop drive system.

FIG. 1 is a schematic perspective view of an exemplary loop drive system 100. An orthogonal coordinate system 12 defines orthogonal X, Y, and Z axes of loop drive system 100, with the Z-axis being vertical, that is, parallel to the force of gravity, and the X- and Y-axes being horizontal. The terms "upper" and "lower" as used herein are defined with respect to the Z-axis. In the exemplary embodiment, loop drive system 100 includes a drive loop 102 extending in a closed loop around an upper gear 104 and a lower gear 106. More specifically, drive loop 102 is rotatable around upper gear 104 and lower gear 106. Drive loop 102 extends in the closed loop through an ascending side 111, which travels upward in the Z-direction while loop drive system 100 is in operation, and a descending side 113, which travels downward in the Z direction while loop drive system 100 is in operation.

Ascending side 111 of drive loop 102 extends through a tank 108. Tank 108 is configured to retain a liquid medium 110. In the exemplary embodiment, liquid medium 110 is fresh water. In alternative embodiments, liquid medium 110 includes any liquid that enables loop drive system 100 to function as described herein. In the exemplary embodiment, tank 108 includes a circumferentially closed sidewall 116 that extends from an upper end 112 to a lower end 114. In the exemplary embodiment, upper end 112 is open, such that ascending side 111 of drive loop 102 extends therethrough unimpeded by tank 108. In alternative embodiments, upper end 112 is at least partially closed.

Figure 2:
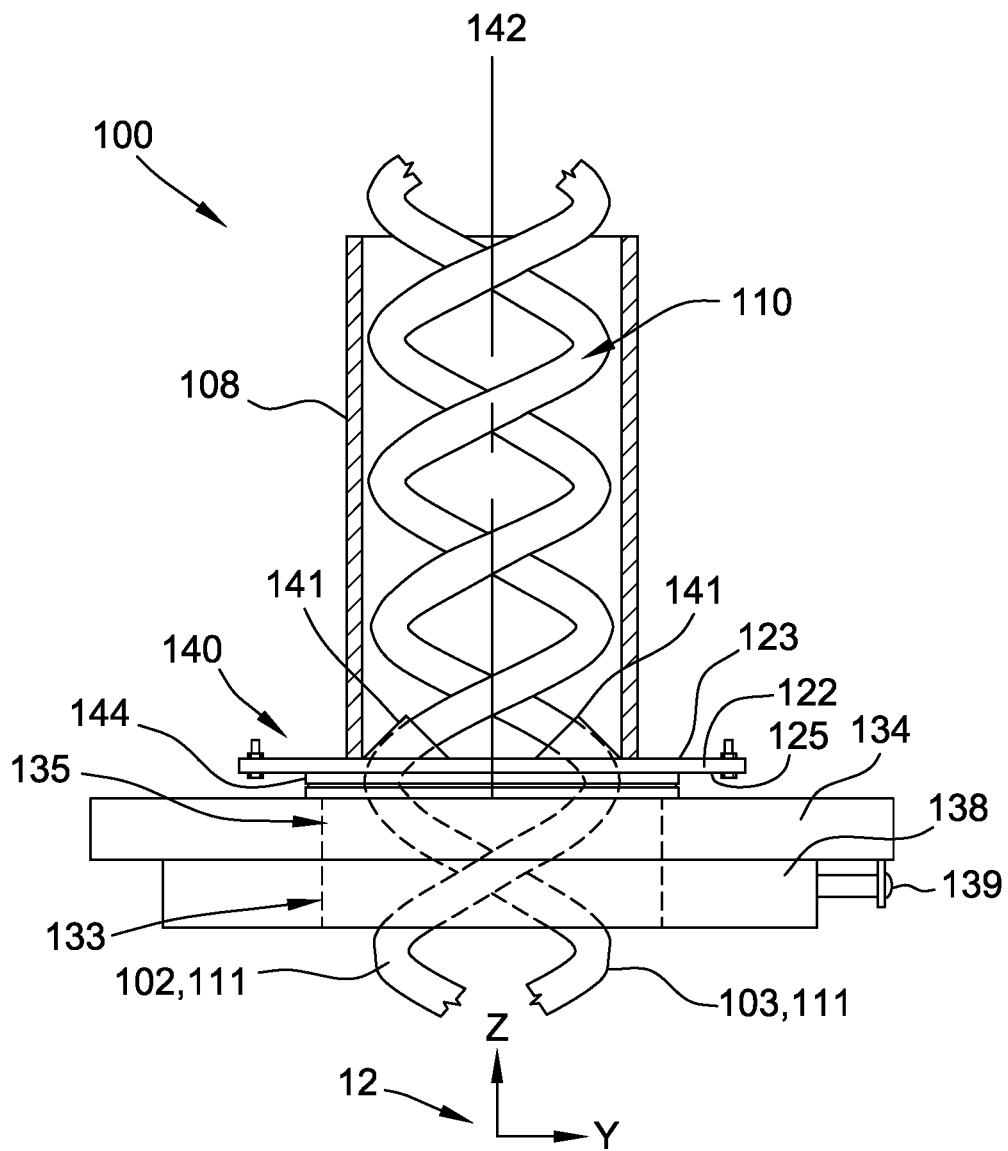
FIG. 2 is a schematic perspective view of another exemplary loop drive system.

Loop drive system 100 also includes an inlet housing 140 fixedly coupled to lower end 114 of tank 108. Inlet housing 140 is rotatable about the Z-axis with respect to a stationary support structure 128. Inlet housing 140 is configured to enable passage of ascending side 111 of drive loop 102 therethrough, while inhibiting leakage of liquid medium 110 from tank 108. In the exemplary embodiment, inlet housing 140 includes a base plate 122 sealingly coupled to lower end 114 of sidewall 116. For example, in the exemplary embodiment, sidewall 116 is generally tubular in shape such that sidewall 116 has an annular cross-section in the X-Y plane, tank 108 is generally cylindrical, and base plate 122 has a cross-section sized to cover the circular opening of tank 108 at lower end 114. In alternative embodiments, tank 108 and sidewall 116 have any suitable shape and/or base plate 122 has any suitable configuration that enables base plate 122 to sealingly couple to lower end 114 of sidewall 116. In the exemplary embodiment, as best seen in FIG. 2, base plate 122 includes an upper surface 123 and a lower surface 125.

Loop drive system 100 further includes stationary support structure 128 configured to support upper gear 104 and lower gear 106 for rotation with respect to stationary support structure 128. In the exemplary embodiment, stationary support structure 128 includes a pair of beams, 130, 132 extending vertically in the Z-direction and spaced apart in the Y-direction, such that upper gear 104 and lower gear 106 are positionable between beam 130 and beam 132 in a clearance fit. In alternative embodiments, stationary support structure 128 includes any suitable support members that enable loop drive system 100 to function as described herein.

In the exemplary embodiment, upper gear 104 and lower gear 106 are coupled to stationary support structure 128 via an upper gear support 124 and a lower gear support 126, respectively. Upper gear support 124 and lower gear support 126 are positioned respectively above and below tank 108 and define respective axes of rotation 204 (shown in FIG. 6A) for upper gear 104 and lower gear 106. In the exemplary embodiment, upper gear support 124 and lower gear support 126 are oriented parallel to each other, and more specifically are each aligned in the Y direction with reference to coordinate system 12. In alternative embodiments, upper gear support 124 and lower gear support 126 are oriented in any suitable fashion that enables loop drive system 100 to function as described herein.

In the exemplary embodiment, upper gear support 124 and lower gear support 126 are journaled to stationary support structure 128 and rotatable about the Y-axis with respect to stationary support structure 128, and fixedly coupled to upper gear 104 and lower gear 106 respectively. Alternatively, upper gear support 124 and lower gear support 126 are fixedly coupled to stationary support structure 128, and upper gear 104 and lower gear 106 are journaled respectively to upper gear support 124 and lower gear support 126 and rotatable about the Y-axis with respect to upper gear support 124 and lower gear support 126 and stationary support structure 128.

In the exemplary embodiment, at least one of upper gear 104 and lower gear 106 is coupled to a load 121, such that rotation of at least one of upper gear 104 and lower gear 106 does work on load 121. For example, but not by way of limitation, load 121 is an electrical power generator or a mechanical drive. In alternative embodiments, neither of upper gear 104 and lower gear 106 is coupled to load 121.

In the exemplary embodiment, at least one of upper gear 104 and lower gear 106 is coupled to a power source 119 configured to drive rotation of at least one of upper gear 104 and lower gear 106, such that loop drive system 100 is operable to transmit energy provided by, for example, power source 119 to load 121. For example, in the illustrated embodiment, upper gear 104 is coupled to power source 119, and lower gear 106 is coupled to load 121. For example, but not by way of limitation, power source 119 is one of a wind turbine, a gas turbine, an electrical motor, and a solar cell. In alternative embodiments, neither of upper gear 104 and lower gear 106 is coupled to power source 119.

Drive loop 102 is rotatable about an axis of rotation defined centrally between the respective axes of rotation of upper gear 104 and lower gear 106. Moreover, drive loop 102 rotatably engages upper gear 104 and lower gear 106 in a substantially non-slip relationship such that a motive force applied to any of drive loop 102, upper gear 104, and lower gear 106 causes drive loop 102, upper gear 104, and lower gear 106 each to rotate about their respective axes of rotation.

In the exemplary embodiment, a weight of ascending side 111 is substantially equal to a weight of descending side 113, and liquid medium 110 at least partially counteracts the weight of ascending side 111. In some embodiments, drive loop 102 is composed of a material that has a density less than a density of liquid medium 110. For example, but not by way of limitation, liquid medium 110 is fresh water, and drive loop 102 is composed of a light weight foam with a density less than that of fresh water. Thus, in the exemplary embodiment, liquid medium 110 in tank 108 exerts a buoyancy force on ascending side 111 of drive loop 102 in the Z-direction, opposite the force of gravity. The buoyancy force is transferred by drive loop 102 to upper gear 104 and lower gear 106 and tends to increase an amount of work transferred to load 121. In alternative embodiments, drive loop 102 is composed of a material that has a density equal to or greater than a density of liquid medium 110.

In the exemplary embodiment, drive loop 102 has a helical shape. The helical shape of drive loop 102 increases a buoyancy force exerted by liquid medium 110 on ascending side 111 of drive loop 102, as compared to relatively straighter shapes of drive loop 102. In alternative embodiments, drive loop 102 has any shape that enables loop drive system 100 to function as described herein.

Figure 5A:
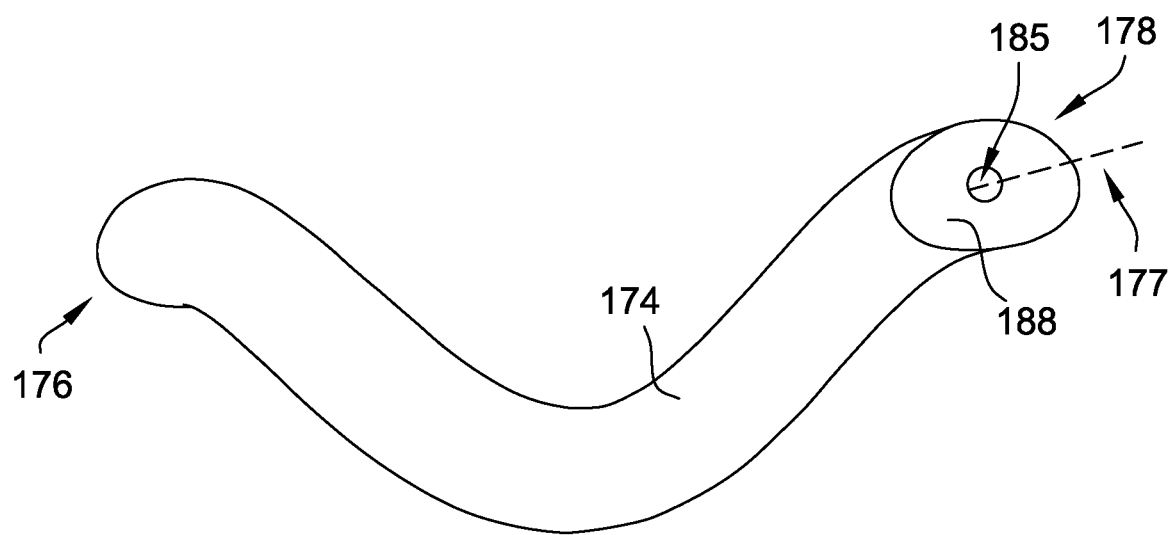
FIG. 5A is a schematic isolated top view of an exemplary section of a helical drive loop for use with the exemplary loop drive systems shown in FIG. 1 or FIG. 2.
Figure 5B:
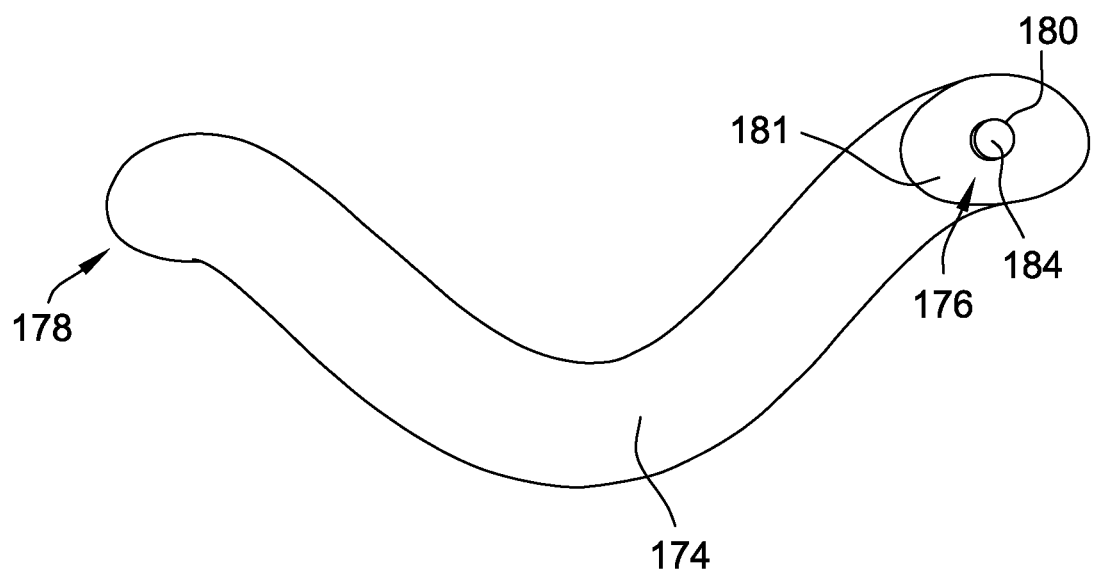
FIG. 5B is a schematic isolated side view of the helical drive loop section shown in FIG. 5A.

Further in the exemplary embodiment, drive loop 102 is composed of a plurality of sections 174 coupled together serially to define a helical shape. FIG. 5A is a schematic isolated top view of an exemplary embodiment of one of sections 174, and FIG. 5B is a schematic isolated side view of section 174 shown in FIG. 5A. In the exemplary embodiment, each section 174 extends over a 360-degree helical sweep from a male end 176 to an opposite female end 178. In alternative embodiments, each section 174 extends over any suitable helical sweep that enables loop drive system 100 to function as described herein.

In the exemplary embodiment, male end 176 of each section 174 is configured to couple to female end 178 of an adjacent section 174 in a face-to-face relationship, such that adjacent sections 174 are rotatable with respect to each other about an axis 177 normal to an end face 188 of female end 178 while male end 176 and female end 178 maintain the face-to-face relationship. Specifically, each pair of adjacent sections 174 is configured to rotate with respect to each other about axis 177, while male end 176 and female end 178 remain in substantially face-to-face relationship, as the pair of adjacent sections 174 engage and traverse around upper gear 104 and lower gear 106. In some embodiments, the rotation about axis 177 normal to female end 178, while male end 176 and female end 178 remain in substantially face-to-face relationship, reduces friction losses associated with other means of coupling adjacent sections 174, such as hinges (not shown).

In the exemplary embodiment, male end 176 includes a pin 180 that extends away from an end face 181 of male end 176 to a pin end 184. Female end 178 includes end face 188, and an opening 185 depending from end face 188. Specifically, in the exemplary embodiment, male end 176 of each section 174 is configured to couple to female end 178 of an adjacent section 174 by inserting pin 180 into opening 185 such that at least a portion of pin 180 is received in opening 185 in a clearance fit that enables pin 180 positioned in opening 185 to rotate about axis 177.

Figure 5C:
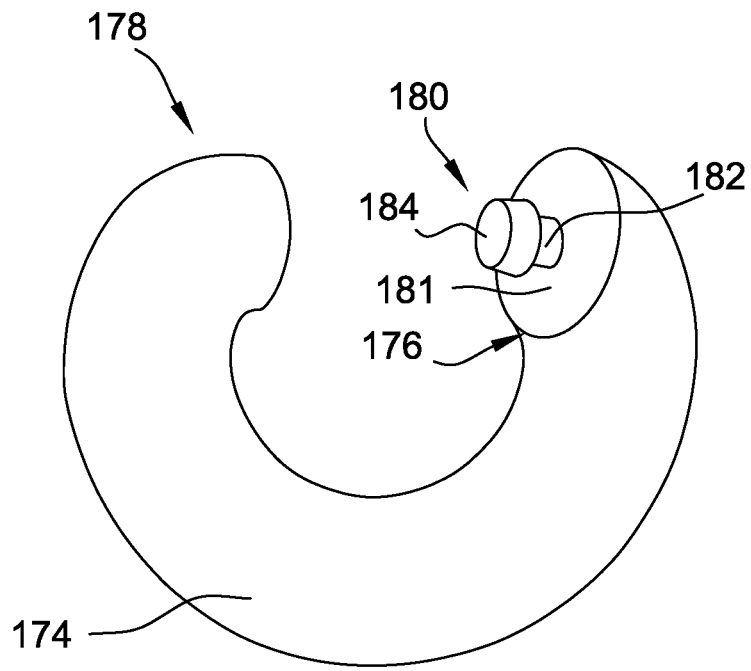
FIG. 5C is a schematic isolated perspective view of an alternative exemplary section of a helical drive loop for use with the exemplary loop drive systems shown in FIG. 1 or FIG. 2.
Figure 5D:
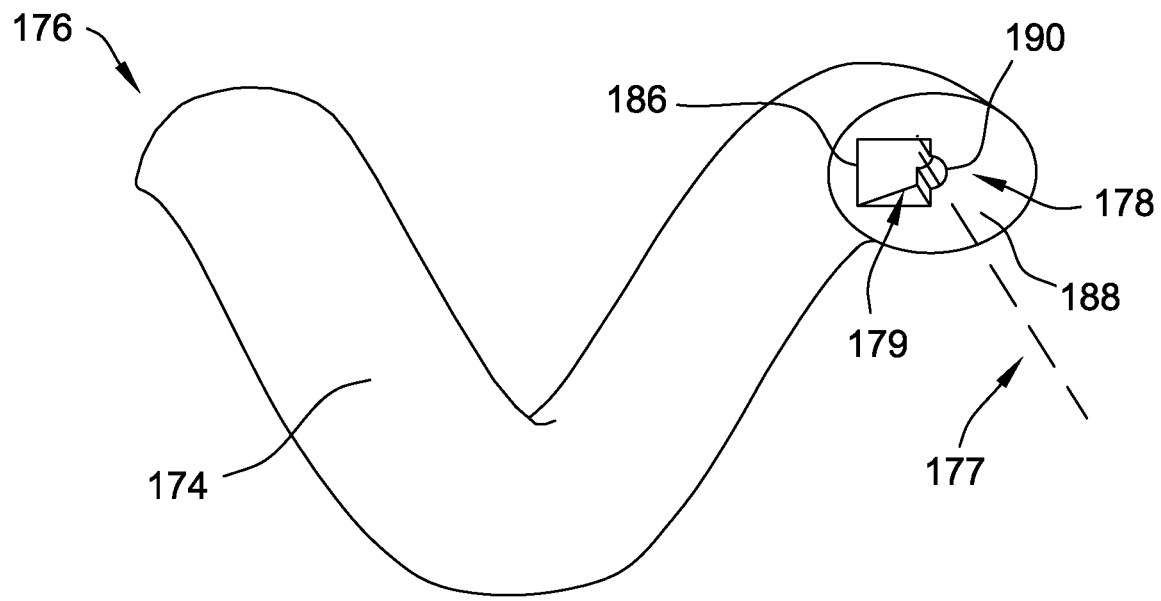
FIG. 5D is a schematic isolated side view of the helical drive loop section shown in FIG. 5C.

FIG. 5C is a schematic isolated perspective view of an alternative embodiment of section 174. FIG. 5D is a schematic isolated side view of section 174 shown in FIG. 5C. In the illustrated embodiment, pin 180 further includes a neck 182 located between end face 181 and pin end 184 and having a diameter less than a diameter of pin end 184. Female end 178 includes end face 188, and an indent 186 depending from end face 188 and transitioning into a recess 179. Recess 179 is defined centrally in female end 178 and is partially covered by a neck holster portion 190 of end face 188. Specifically, in the exemplary embodiment, male end 176 of each section 174 is configured to couple to female end 178 of an adjacent section 174 by sliding pin 180 along indent 186 such that pin end 184 is received in recess 179 and neck 182 engages neck holster portion 190. Neck holster portion 190 is sized to receive neck 182 in a clearance fit, but to inhibit passage of pin end 184 therethrough in a direction parallel to axis 177. Thus, after engagement of pin 180 in recess 179, rotation of male end 176 about female end 178 of the adjacent section 174 is permitted, but translation of male end 176 away from female end 178 in the normal direction, parallel to axis 177, is inhibited.

In alternative embodiments, male end 176 and female end 178 are configured to couple together in any suitable fashion that enables drive loop 102 to function as described herein.

FIG. 2 is a schematic perspective view of another exemplary embodiment of loop drive system 100. In the exemplary embodiment, a centerline 142 of tank 108 extending along the Z-axis is shown. In the exemplary embodiment, a second drive loop 103 extends in a closed loop around upper gear 104 and lower gear 106 and engages upper gear 104 and lower gear 106 in a substantially non-slip relationship. Second drive loop 103 also includes an ascending side 111 which travels upward in the Z direction while loop drive system 100 is in operation, and a descending side 113 (not shown in FIG. 2) which travels downward in the Z direction while loop drive system 100 is in operation. In the exemplary embodiment, second drive loop 103 is substantially identical to first drive loop 102 as described above. Moreover, first drive loop 102 and second drive loop 103 have identical helical shapes, and second drive loop 103 is coupled to upper gear 104 and lower gear 106 such that ascending side 111 of second drive loop 103 is rotated 180 degrees about the Z-axis relative to ascending side 111 of first drive loop 102. More specifically, respective ascending sides 111 of first drive loop 102 and second drive loop 103 are arranged in a double helix relationship. Thus, during operation of loop drive system 100, first drive loop 102 and second drive loop 103 each circulate about upper gear 104 and lower gear 106 without interfering with each other.

In the exemplary embodiment, a weight of ascending side 111 of second drive loop 103 is substantially equal to a weight of descending side 113 of second drive loop 103, and liquid medium 110 at least partially counteracts the weight of ascending side 111. In some embodiments, second drive loop 103 is likewise composed of a material that has a density less than a density of liquid medium 110, such that liquid medium 110 in tank 108 exerts a buoyancy force on ascending side 111 of both first drive loop 102 and second drive loop 103 in the Z direction. In alternative embodiments, second drive loop 103 is composed of a material that has a density equal to or greater than a density of liquid medium 110. The buoyancy force is transferred by first drive loop 102 and second drive loop 103 to upper gear 104 and lower gear 106 and tends to increase an amount of work transferred to load 121. Thus, the dual drive loop configuration illustrated in FIG. 2 tends to increase a performance of loop drive system 100 relative to a single drive loop configuration, while occupying substantially the same footprint as the single drive system. In alternative embodiments, loop drive system 100 includes any suitable number of helical drive loops, such as three or more, oriented in any suitable relationship.

Figure 3:
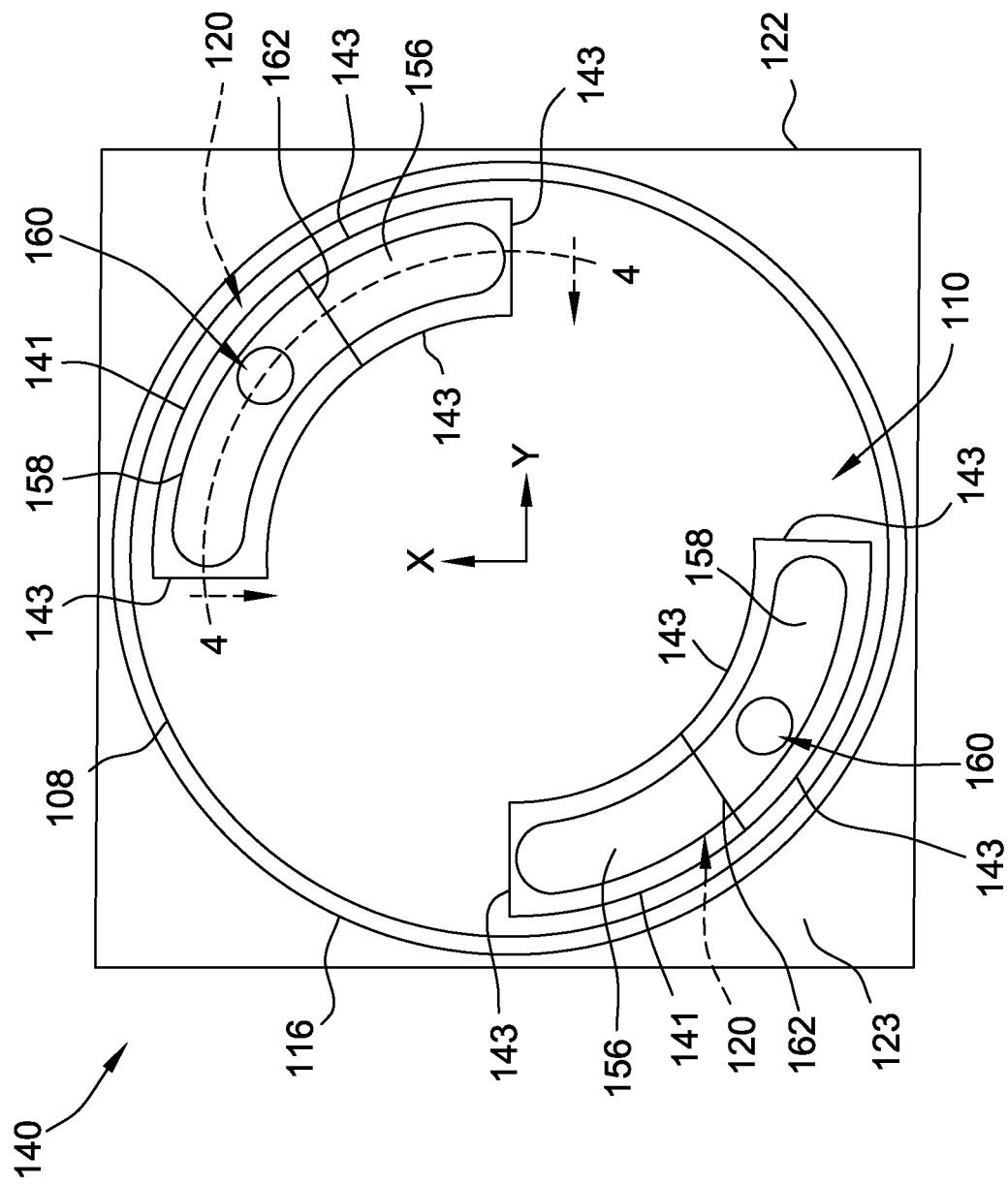
FIG. 3 is a schematic plan view of an exemplary inlet housing for use with the loop drive system shown in FIG. 2.

FIG. 3 is a schematic plan view of an exemplary embodiment of inlet housing 140 for use with the embodiment of loop drive system 100 shown in FIG. 2. With reference to FIGS. 2 and 3, in the exemplary embodiment, inlet housing 140 includes two inlet seals 141 spaced 180 degrees apart and configured to receive first drive loop 102 and second drive loop 103, respectively, therethrough. An embodiment of inlet housing 140 having a single inlet seal 141 corresponding to the single drive loop 102 shown in FIG. 1, and otherwise substantially identical to inlet housing 140 described here with respect to FIG. 3, is suitable for use with the embodiment of loop drive system 100 shown in FIG. 1.

Each inlet seal 141 is fixedly coupled to base plate 122. As described above, tank 108 is coupled to base plate 122 at lower end 114 of sidewall 116. In the exemplary embodiment, base plate 122 defines a respective slot 120 extending therethrough in the Z-direction and positioned with respect to a corresponding inlet seal 141. More specifically, each slot 120 is positioned with respect to the corresponding inlet seal 141 such that ascending side 111 of one of first drive loop 102 and second drive loop 103 is receivable from beneath inlet housing 140, through slot 120, through inlet seal 141, and into liquid medium 110 within tank 108. In the exemplary embodiment, each of slot 120 and inlet seal 141 is curved about the Z-axis such that slot 120 and inlet seal 141 are oriented substantially parallel to sidewall 116 of tank 108, in order to facilitate receiving a curvature of ascending side 111 of one of helically shaped drive loops 102, 103 therethrough. In alternative embodiments, each of slot 120 and inlet seal 141 is shaped in any suitable fashion that enables loop drive system 100 to function as described herein.

In the exemplary embodiment, loop drive system 100 also includes an intermediate plate 134 coupled to inlet housing 140 such that inlet housing 140 is rotatable about the Z-axis with respect to intermediate plate 134. More specifically, in the exemplary embodiment, intermediate plate 134 is coupled to, and positioned beneath, base plate 122 of inlet housing 140 such that base plate 122 is rotatable about the Z-axis with respect to intermediate plate 134. During operation of loop drive system 100, due to the helical shape of first drive loop 102 and second drive loop 103, a position of drive loops 102, 103 within the plane of base plate 122 rotates about the Z-axis as ascending side 111 ascends through base plate 122. The rotatable coupling of inlet housing 140 to intermediate plate 134 enables base plate 122, and tank 108 fixedly coupled to base plate 122, also to rotate about the Z-axis, maintaining the alignment of drive loops 102, 103 with the respective slots 120 and corresponding inlet seals 141 of inlet housing 140. Intermediate plate 134 includes a central opening 135 extending therethrough in the Z-direction and sized to allow drive loops 102, 103 to pass therethrough. For example, in the exemplary embodiment, base plate 122 is coupled to intermediate plate 134 via an annular bearing 144 that also enables drive loops 102, 103 to pass therethrough. In alternative embodiments, inlet housing 140 is coupled to intermediate plate 134 in any suitable fashion that enables loop drive system 100 to function as described herein.

In the exemplary embodiment, intermediate plate 134 is further coupled to stationary support structure 128 for bi-directional translation parallel to the X-axis with respect to stationary support structure 128. More specifically, during operation of loop drive system 100, as drive loops 102, 103 helically advance through respective inlet seals 141 and thereby exert a force which causes base plate 122 to rotate, a freedom of intermediate plate 134 to translate bi-directionally in the X-direction relative to stationary support structure 128 reduces frictional losses caused by the interaction of drive loops 102, 103 and the corresponding inlet seals 141. For example, in the exemplary embodiment, stationary support structure 128 includes a static platform 138 fixedly coupled to beams 130, 132 and extending therefrom in the X-direction. Intermediate plate 134 is coupled to static platform 138 via a drawer slide mechanism 139 that enables intermediate plate 134 to translate bi-directionally in the X-direction relative to static platform 138. Static platform 138 includes a central opening 133 extending therethrough in the Z-direction and sized to allow drive loops 102, 103 to pass therethrough. In alternative embodiments, intermediate plate 134 is coupled to stationary support structure 128 for bi-directional translation in the X-direction in any suitable fashion that enables loop drive system 100 to function as described herein. In other alternative embodiments, intermediate plate 134 is fixedly coupled to stationary support structure 128.

Figure 4:
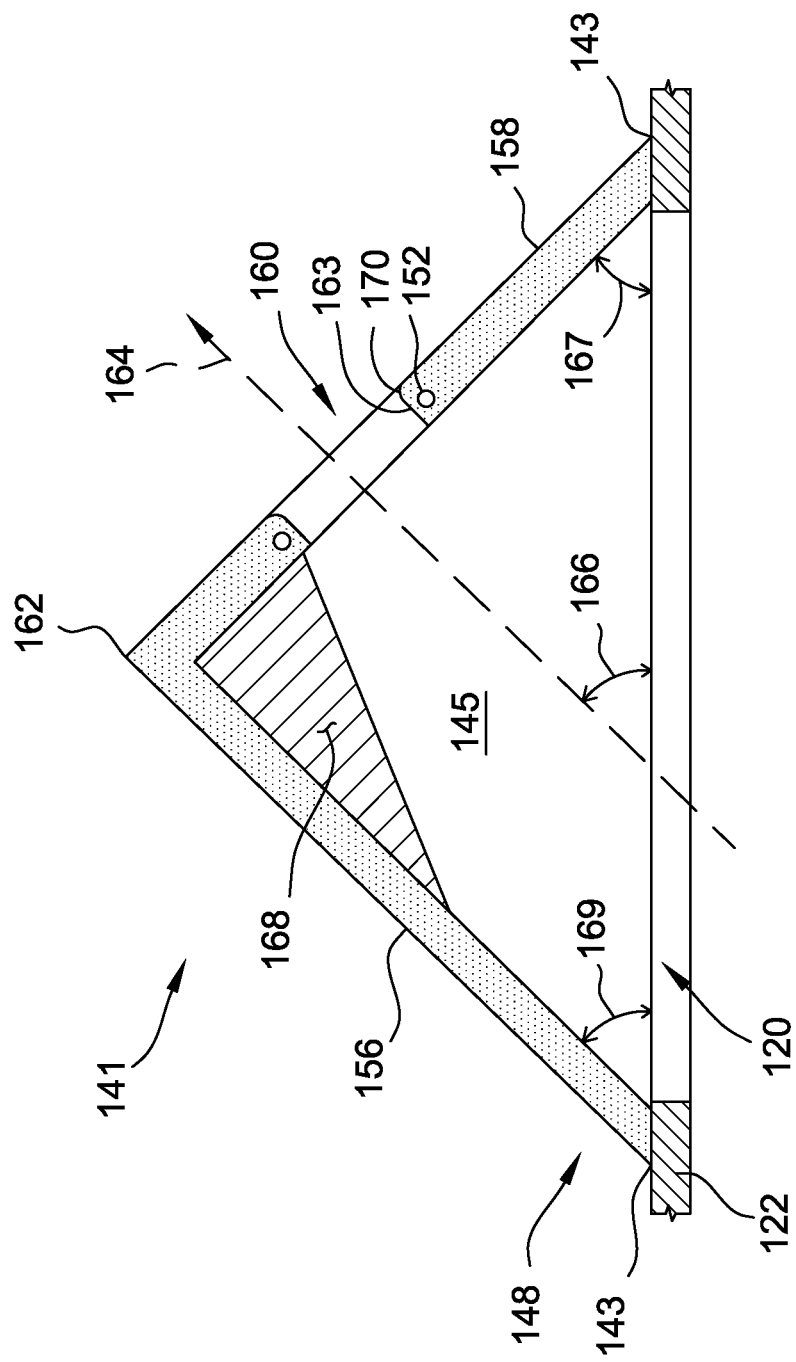
FIG. 4 is a schematic sectional view of an exemplary inlet seal for use with the inlet housing shown in FIG. 3, taken along lines 4-4 shown in FIG. 3.

FIG. 4 is a schematic sectional view of an exemplary inlet seal 141 taken along lines 4-4 shown in FIG. 3. More specifically, inlet seal 141 is illustrated as coupled to base plate 122 and positioned directly above slot 120 defined in base plate 122. With reference to FIGS. 1-4, in the exemplary embodiment, inlet seal 141 includes a perimeter 143 coupled to base plate 122 such that perimeter 143 surrounds slot 120, and such that an inlet seal chamber 145 is defined between inlet seal 141 and slot 120 in flow communication with slot 120. Moreover, inlet seal 141 defines an exit port 160 extending therethrough and in flow communication with inlet seal chamber 145. Inlet seal 141 is configured to receive ascending side 111 of one of drive loops 102, 103 from slot 120, through inlet seal chamber 145, and through exit port 160 into liquid medium 110 (shown in FIGS. 1 and 2), and to simultaneously inhibit leakage of liquid medium 110 from tank 108 through slot 120 of base plate 122.

In the exemplary embodiment, helical drive loops 102, 103 are shaped such that, as ascending side 111 ascends through base plate 122, ascending side 111 advances through exit port 160 in an exit direction 164 that forms an exit angle 166 with base plate 122. Moreover, exit port 160 is oriented such that exit direction 164 is parallel to a centerline axis of exit port 160. For example, in the exemplary embodiment, exit port 160 is defined in an exit wall 158 of inlet seal 141. Exit wall 158 slopes upward from perimeter 143 and is oriented with respect to base plate 122 at an exit angle 167 that is complementary to exit angle 166, such that exit wall 158 is perpendicular to exit direction 164. Exit port 160 is defined by a generally cylindrical port wall 163 that extends circumferentially around, and axially parallel to, exit direction 164. In some embodiments, exit wall 158 being perpendicular to exit direction 164, such that exit direction 164 is parallel to the centerline axis of exit port 160, facilitates a reduced contact area between ascending side 111 and port wall 163 of inlet seal 141, as compared to alternative orientations of exit wall 158, thus reducing friction losses caused by ascending side 111 moving through exit port 160. In alternative embodiments, each of exit port 160 and exit wall 158 is oriented in any suitable fashion with respect to exit direction 164 that enables loop drive system 100 to function as described herein.

Inlet seal 141 further includes a containment wall 156. Containment wall 156 includes no openings and is configured to provide structural integrity to inlet seal 141 sufficient to withstand forces applied to inlet seal 141 by movement of ascending side 111 therethrough. In the exemplary embodiment, containment wall 156 slopes upward from perimeter 143 and is coupled to exit wall 158 at an apex 162. In alternative embodiments, containment wall 156 has any suitable shape that enables loop drive system 100 to function as described herein. In the exemplary embodiment, containment wall 156 is oriented with respect to base plate 122 at an angle 169 that is equal to exit angle 166. In some embodiments, containment wall angle 169 being equal to exit angle 166 facilitates smoothly guiding ascending side 111 toward exit port 160 as ascending side 111 ascends through slot 120. In alternative embodiments, containment wall 156 is oriented with respect to base plate 122 in any suitable fashion that enables loop drive system 100 to function as described herein.

In the exemplary embodiment, drive loops 102, 103 have a helix angle 107 (shown in FIG. 6A) of 45 degrees, exit angle 166 and containment wall angle 169 are each about 45 degrees, and exit angle 167 is complementary to exit angle 166, that is, sums with exit angle 166 to total 90 degrees. In alternative embodiments, each of drive loops 102, 103 has any suitable helix angle 107, and each of exit angle 166, containment wall angle 169, and exit angle 167 have any suitable value that enables loop drive system 100 to function as described herein.

Further in the exemplary embodiment, inlet seal 141 includes a sealing mechanism 152 coupled to port wall 163. Sealing mechanism 152 is configured to seal against a leakage flow of liquid medium 110 from tank 108 through exit port 160 between ascending side 111 and port wall 163. For example, but not by way of limitation, sealing mechanism 152 includes an O-ring retained in a groove defined in port wall 163. In alternative embodiments, inlet seal 141 is configured to inhibit leakage through exit port 160 between ascending side 111 and port wall 163 in any suitable fashion that enables loop drive system 100 to function as described herein.

Additionally, in some embodiments, inlet seal 141 includes a filler material 168 coupled adjacent to inlet seal chamber 145 and shaped to guide ascending side 111 from slot 120 towards exit port 160. For example, in the exemplary embodiment, filler material 168 is coupled to exit wall 158 and containment wall 156 adjacent to apex 162, and shaped to inhibit ascending side 111 from moving upward within inlet seal chamber 145 beyond a vertical position of exit port 160. In alternative embodiments, filler material 168 is configured in any suitable fashion that enables loop drive system 100 to function as described herein In the exemplary embodiment, port wall 163 includes a radiused edge 170 configured to further reduce friction between ascending side 111 and port wall 163. In alternative embodiments, port wall 163 does not include radiused edge 170.

Figure 6A:
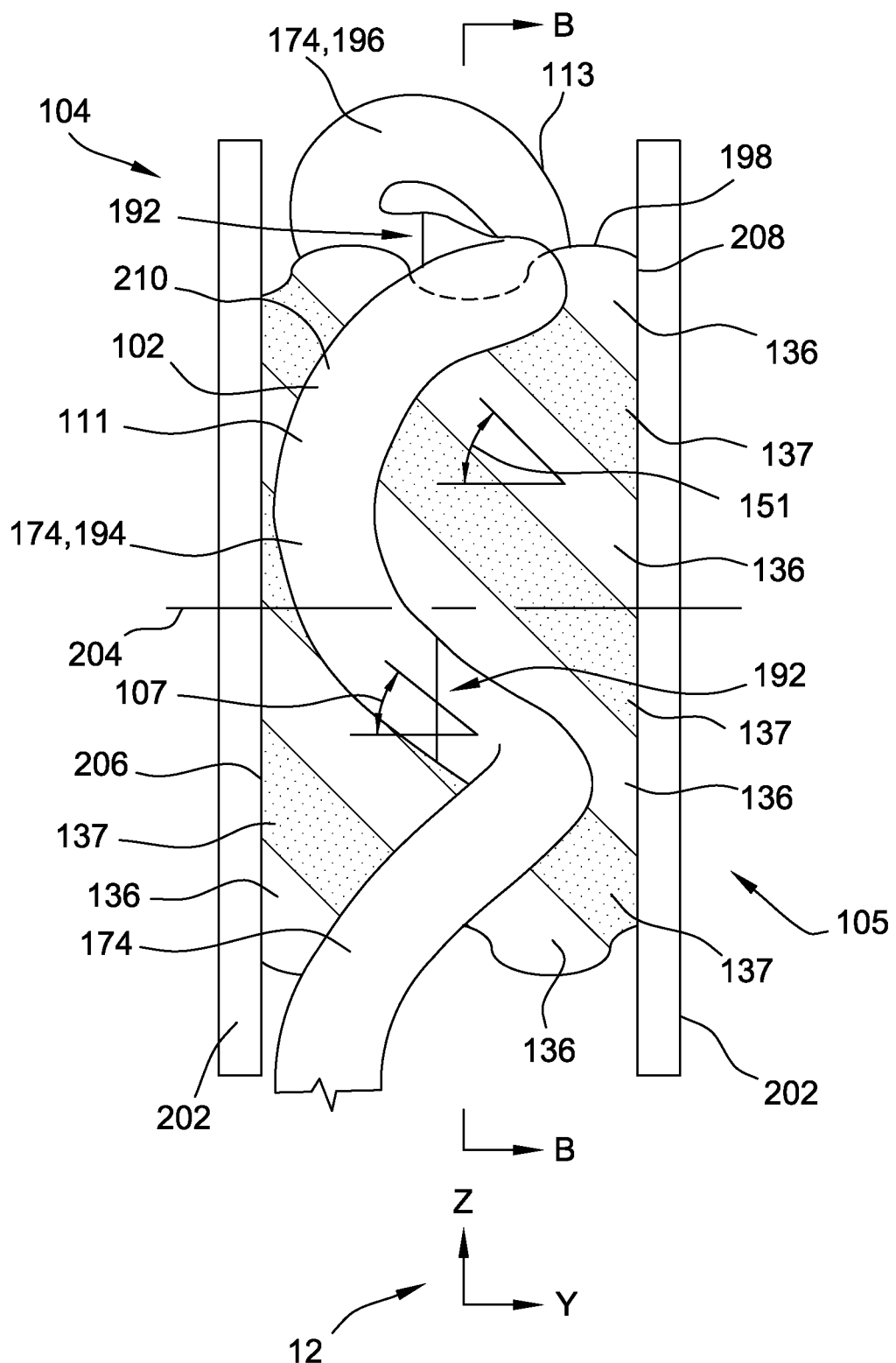
FIG. 6A is a schematic side view of an upper end of the loop drive system shown in FIG. 1, including an exemplary upper gear.
Figure 6B:
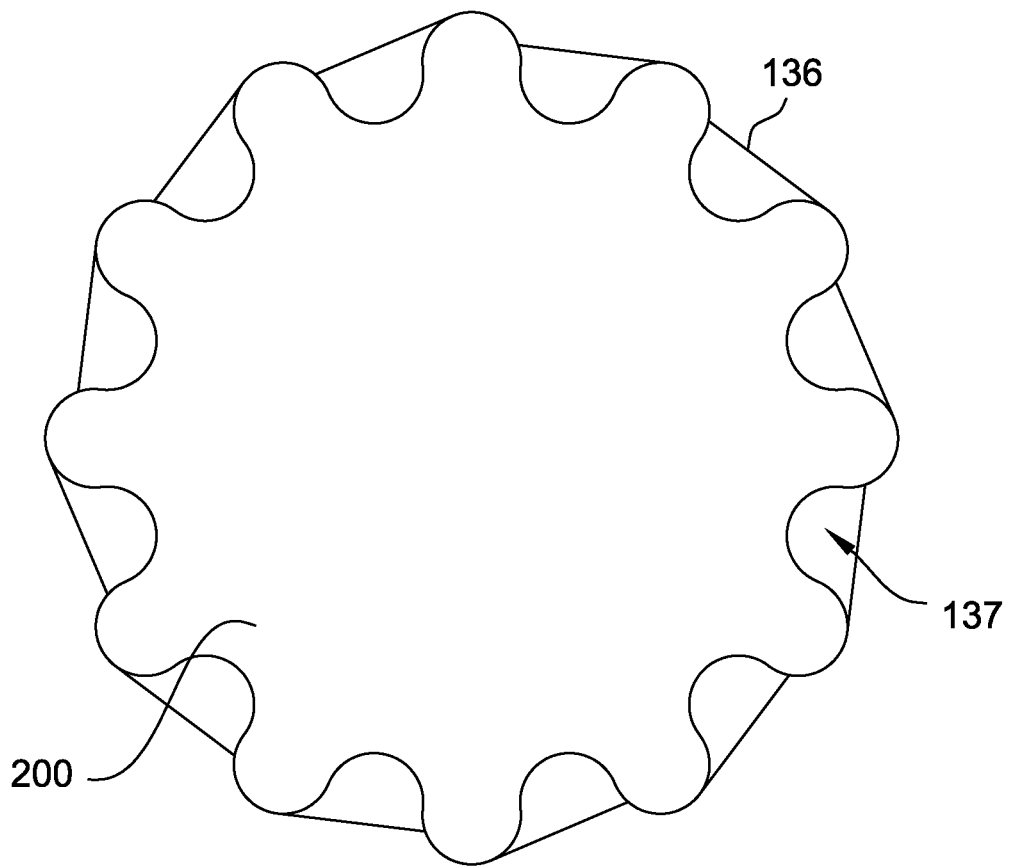
FIG. 6B is a schematic sectional view of an exemplary upper gear of the loop drive system shown in FIG. 1 taken along the line B-B shown in FIG. 6A.

FIG. 6A is a schematic side view of an upper end 105 of the embodiment of loop drive system 100 shown in FIG. 1, including an exemplary embodiment of upper gear 104. FIG. 6B is a sectional view of upper gear 104 taken along line B-B shown in FIG. 6A. In the exemplary embodiment, sections 174 of drive loop 102 are coupled at a plurality of joints 192, at which male end 176 of each section 174 is coupled to female end 178 of an adjacent section 174 as discussed above with respect to FIGS. 5A and 5B. Moreover, ascending side 111 includes an uppermost section 174, designated uppermost ascending section 194, and descending side 113 includes an uppermost section 174, designated uppermost descending section 196. FIG. 6A illustrates a point of operation at which respective male and female ends 176, 178 (shown in FIGS. 5A and 5B) of uppermost ascending section 194 and uppermost descending section 196 are rotating with respect to each other in face-to-face relationship, as described above, as drive loop 102 passes around an apex 198 of upper gear 104.

Upper gear 104 includes a core 200 configured to engage drive loop 102. In the exemplary embodiment, core 200 is sandwiched between a pair of side members 202 of upper gear 104, such that upper gear 104 has a generally spool-like shape. More specifically, in the exemplary embodiment, side members 202 are coupled to a pair of opposing planar side faces 206 and 208 of core 200, oriented normal to an axis of rotation 204 of upper gear 104. In alternative embodiments, side members 202 have any suitable configuration and orientation that enables loop drive system 100 to function as described herein. In other alternative embodiments, upper gear 104 does not include side members 202.

In the exemplary embodiment, core 200 includes a plurality of teeth 136 configured to successively engage each section 174 as each section 174 transitions through the positions of uppermost ascending section 194 and uppermost descending section 196. For example, in the exemplary embodiment, teeth 136 are oriented with respect to the Y-axis at a tooth angle 151 that is substantially equal to helix angle 107. Each pair of adjacent teeth 136 is spaced apart by a corresponding one of a plurality of troughs 137 defined therebetween, and troughs 137 are sized to receive a width of sections 174 therein in a clearance fit, such that teeth 136 are configured for driving engagement with drive loop 102. In alternative embodiments, teeth 136 are configured to successively engage each section 174 in any suitable fashion that enables loop drive system 100 to function as described herein.

In the exemplary embodiment, helix angle 107 and tooth angle 151 are substantially equal. For example, each of helix angle 107 and tooth angle 151 is about 45 degrees. In alternative embodiments, each of helix angle 107 and tooth angle 151 is any suitable angle that enables loop drive system 100 to function as described herein. In the exemplary embodiment, drive loop 102 is oriented such that joints 192 of uppermost ascending section 194 and uppermost descending section 196 are received in respective troughs 137, and such that a mid-portion 210 of each section 174, located between and spaced apart from male end 176 and female end 178 (shown in FIGS. 5A and 5B), extends over two respective teeth 136 and one unfilled trough 137 between the two teeth 136. That is, successive sections 174 of drive loop 102 are received in every other trough 137. In alternative embodiments, troughs 137 are spaced on upper gear such that each section 174 of drive loop 102 is received sequentially in adjacent troughs 137 and extends over one respective tooth 136. In alternative embodiments, drive loop 102 is oriented such that mid-portions 210 of uppermost ascending section 194 and uppermost descending section 196 are received in respective troughs 137, and such that each joint 192 extends over a respective tooth 136.

Although illustrated as interfacing with a single drive loop 102, in some embodiments, upper gear 104 substantially as described above is used with loop drive system 100 having dual drive loops 102, 103 oriented in a double-helix relationship, as shown in FIG. 2. Specifically, successive sections 174 of drive loops 102, 103 are received in alternating troughs 137. For example, teeth 136 are positioned such that, for a series of six adjacent troughs 137, the first, third, and fifth troughs 137 successively receive each section 174 of drive loop 102, and the second, fourth, and sixth troughs 137 successively receive each section 174 of drive loop 103. In other words, each of drive loops 102, 103 is independently engaged by plurality of teeth 136 as described above for a single drive loop, such that alternating teeth 136 engage drive loop 102 and drive loop 103 while the double-helix relationship of drive loops 102, 103 is maintained in non-interfering fashion. In alternative embodiments, dual drive loops 102, 103 are configured to engage plurality of teeth 136 in any suitable fashion that enables loop drive system 100 to function as described herein.

In alternative embodiments, core 200 does not include teeth 136. For example, an outer surface of core 200 is configured to successively engage each section 174 via surface friction as each section 174 transitions through the positions of uppermost ascending section 194 and uppermost descending section 196.

In the exemplary embodiment, lower gear 106 is configured in the same fashion as described above with respect to upper gear 104. Alternatively, lower gear 106 is configured in any suitable fashion that enables loop drive system 100 to function as described herein.

Figure 7:
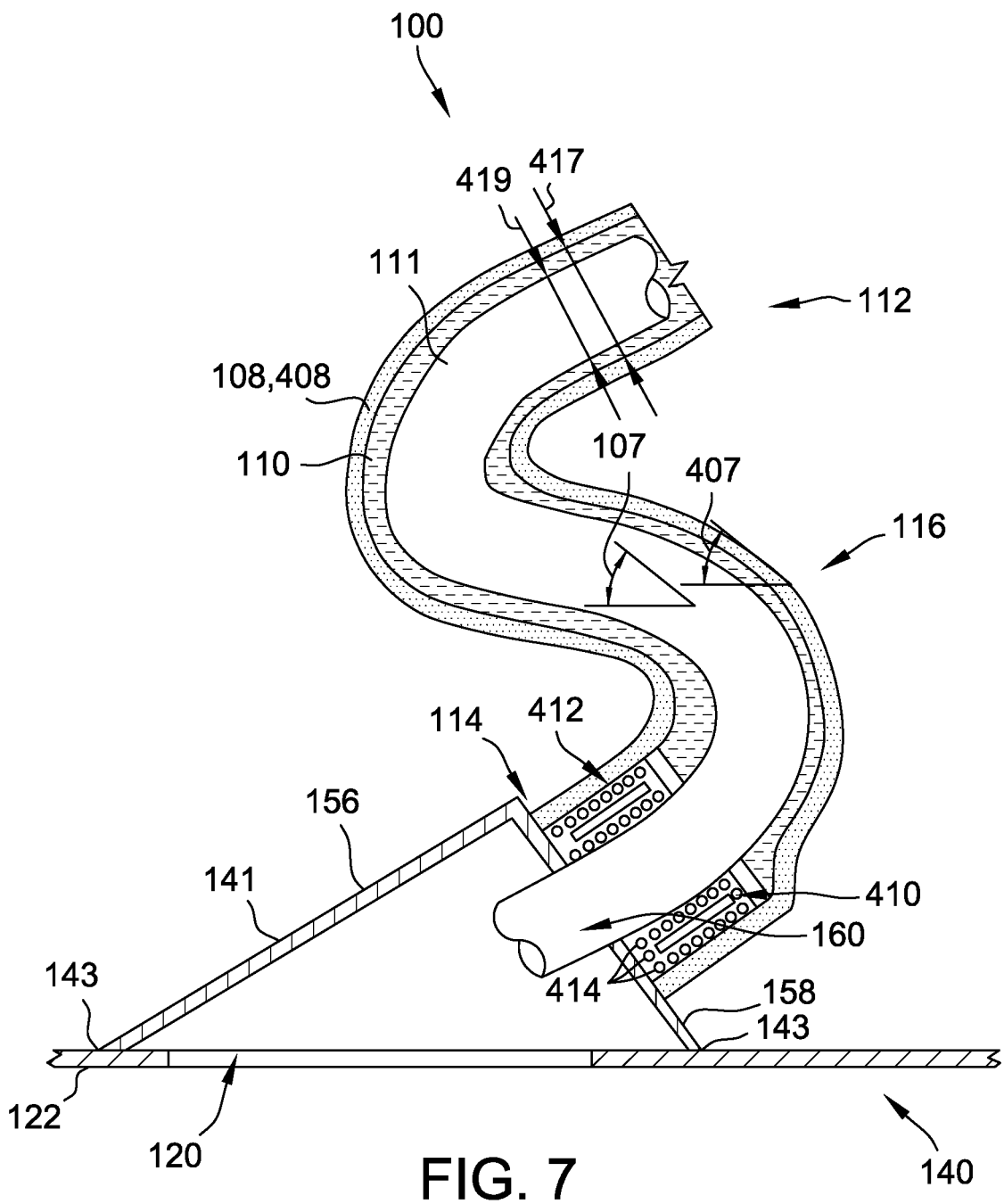
FIG. 7 is a schematic sectional view of a portion of another exemplary embodiment of a loop drive system, including an alternative embodiment of a tank having a helical shape.

FIG. 7 is a sectional view of a portion of loop drive system 100 including an alternative embodiment of tank 108 having a helical shape, designated tank 408. In the illustrated embodiment, loop drive system 100 is substantially identical to loop drive system 100 shown in FIG. 1 or FIG. 2 and FIGS. 3-6, except as described below, and like numbers are used to refer to like elements.

More specifically, tank 408 is again configured to retain liquid medium 110, and again includes a circumferentially closed sidewall 116 that extends from an open upper end 112 to lower end 114. However, sidewall 116 has a helical shape contoured to match the helical shape of ascending side 111 of drive loop 102 or, alternatively, of second drive loop 103. More specifically, sidewall 116 has a helix angle 407 substantially equal to helix angle 107 of ascending side 111. Additionally, sidewall 116 has an inner diameter 417 sized to receive an outer diameter 419 of ascending side 111 therethrough in a clearance fit that enables an annular helical volume of liquid medium 110 to be retained between an interior surface of sidewall 116 and an exterior surface of ascending side 111. Moreover, rather than being sealingly coupled to base plate 122, lower end 114 of tank 408 is sealingly coupled to inlet housing 140 via mounting on exit wall 158 of inlet seal 141, such that the helical shape of sidewall 116 at lower end 114 is aligned with the helical shape of ascending side 111 traveling through exit port 160. Thus, a location of potential leakage between helical tank 408 and inlet housing 140 is reduced to the interface between lower end 114 and exit wall 158 proximate to exit port 160, as compared to the embodiments in which generally cylindrical tank 108 coupled directly to base plate 122 such that an entirety of inlet seal 141 is submerged in liquid medium 110, facilitating concentration of leakage reduction resources. Additionally, a weight of the annular helical volume of liquid medium 110 retained between the interior surface of sidewall 116 and the exterior surface of ascending side 111 is much less than the weight of liquid medium 110 retained in generally cylindrical tank 108, further reducing a potential for leakage of liquid medium 110 at lower end 114.

In some embodiments, lower end 114 of tank 408 includes an inlet bearing 410 configured to facilitate receiving ascending side 111 into tank 408. In the exemplary embodiment, inlet bearing 410 includes a plurality of races 412 coupled to and arranged circumferentially about the interior surface of tank 408 at lower end 114. In alternative embodiments, plurality of races 412 are coupled to inlet seal 141 and arranged circumferentially about exit port 160 within inlet seal 141, on an opposite side of exit wall 158 from lower end 114. In other alternative embodiments, plurality of races 412 are coupled to a bottom side of base plate 122 adjacent to slot 120. In still other alternative embodiments, plurality of races 412 are coupled to any suitable location on loop drive system 100 that enables inlet bearing 410 to function as described herein.

Each race 412 defines a closed path extending axially along ascending side 111 of drive loop 102. A set of roller elements 414 is retained in each race 412. Each set of roller elements 414 is configured to circulate, via rotation of the individual elements 414, along the closed axial path in response to contact with ascending side 111 to facilitate guiding ascending side 111 from slot 120 into lower end 114 with reduced friction. In alternative embodiments, inlet bearing 410 is configured in any suitable fashion that enables loop drive system 100 to function as described herein. In other alternative embodiments, loop drive system 100 does not include inlet bearing 410.

Although only a single inlet seal 141 and a single tank 408 are illustrated in FIG. 7, it should be understood that in certain embodiments, two tanks 408 are arranged in a double helix relationship oriented to receive dual drive loops 102, 103 arranged in a corresponding double helix relationship, as shown in FIG. 2. In other alternative embodiments, any suitable number of tanks 408 are arranged in any suitable relationship oriented to receive any suitable number of drive loops.

Figure 8:
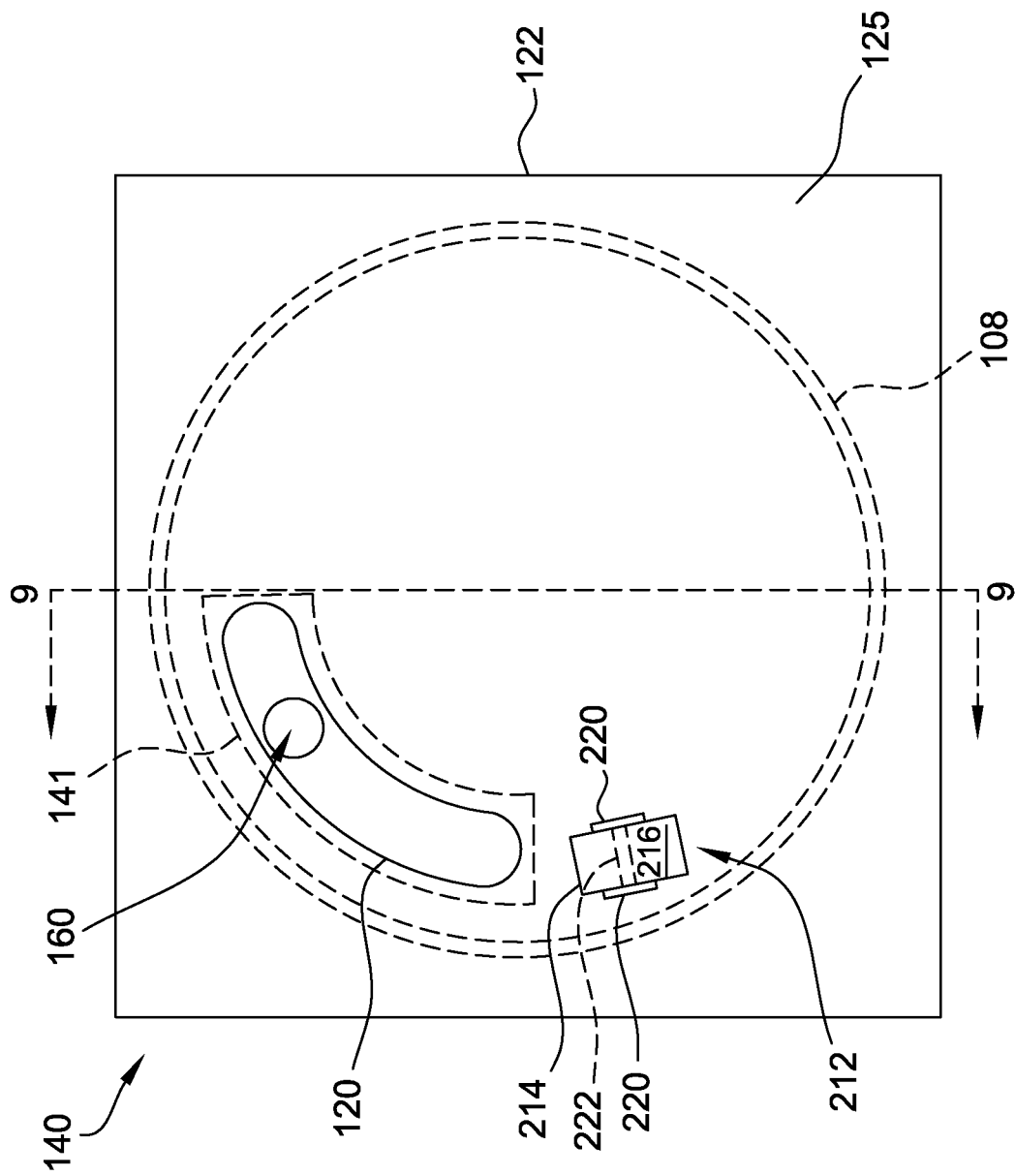
FIG. 8 is a schematic bottom plan view of an alternative inlet housing for use with the loop drive system shown in FIG. 1.
Figure 9:
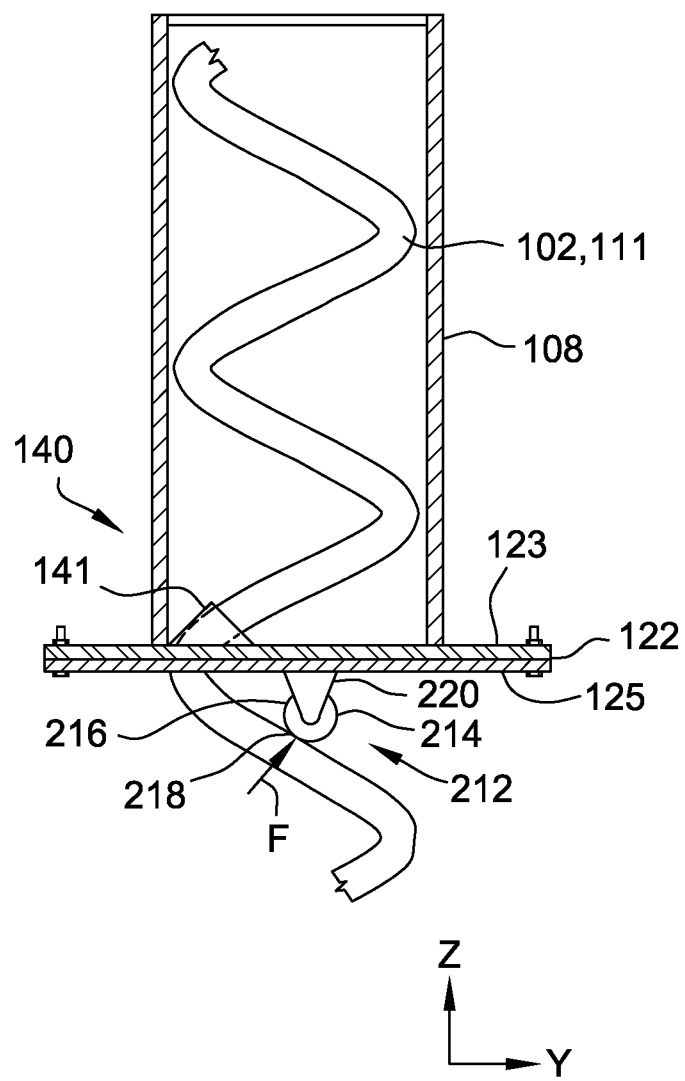
FIG. 9 is a schematic sectional view of the alternative inlet housing shown in FIG. 8, taken along the line 9-9 shown in FIG. 8, illustrating helical drive loop 102 received therethrough.

FIG. 8 is a schematic bottom plan view of an alternative inlet housing 140 for use with the loop drive system 100 shown in FIG. 1. FIG. 9 is a schematic sectional view of the alternative inlet housing 140 shown in FIG. 8, taken along the line 9-9 shown in FIG. 8, illustrating helical drive loop 102 received therethrough. In the exemplary embodiment, inlet housing 140 is substantially identical to inlet housing 140 shown in FIGS. 1-6, except as described below, and like numbers are used to refer to like elements.

More specifically, in the exemplary embodiment inlet housing 140 includes an idler wheel 212 coupled to lower surface 125 of base plate 122 in spaced relationship to inlet seal 141. In the exemplary embodiment, idler wheel 212 includes a wheel body 214 defining a rim surface 216 and a wheel support 218 that couples wheel body 214 to base plate 122. In the exemplary embodiment, wheel support 218 includes a pair of opposed struts 220 fixedly mounted to lower surface 125 of base plate 122 and extending vertically downward in the Z-direction away from base plate 122. In alternative embodiments, wheel support 218 is configured in any suitable fashion that enables wheel support 218 to function as described herein.

In the exemplary embodiment, wheel support 218 further includes a wheel shaft 222 oriented perpendicular to the extension of wheel struts 220 and extending therebetween. In the exemplary embodiment, wheel body 214 is rotatable about wheel shaft 222. In alternative embodiments, wheel body 214 is fixedly coupled to wheel shaft 222 and wheel shaft 222 is rotatable with wheel body 214 about wheel struts 220.

In the exemplary embodiment, rotation of wheel body 214 about wheel shaft 222 facilitates idler wheel 212 guiding helical drive loop 102 through inlet seal 141 and into tank 108. For example, as described above with respect to FIG. 2, inlet housing 140 is rotatably coupled to intermediate plate 134 (shown in FIG. 2) such that base plate 122, and tank 108 fixedly coupled to base plate 122, rotate about the Z-axis. The rotation maintains alignment of drive loop 102 with slot 120 as ascending side 111 of drive loop 102 ascends through base plate 122 and exerts a force on inlet seal 141. In the exemplary embodiment, rotation of base plate 122 is also driven, at least in part, by a force exerted by ascending side 111 of drive loop 102 (shown in FIG. 2) on idler wheel 212 as drive loop 102 ascends and drivingly engages wheel body 214 of idler wheel 212. During operation, drive loop 102 exerts a force F on wheel body 214. Force F is, at least in part, transferred to rotation of wheel body 214 and is, at least in part, transferred through wheel support 218 to cause rotation of base plate 122. Thus, in the exemplary embodiment, during operation, engagement between drive loop 102 and rim surface 216 drives rotation of base plate 122 about the Z-axis relative to intermediate plate 134 (shown in FIG. 2), while the rotated interaction between drive loop 102 and rim surface 216 reduces friction losses as compared to relying solely on the interaction between drive loop 102 and inlet seal 141 to drive rotation of base plate 102. In alternative embodiments, drive loop 102 is configured to engage idler wheel 212 in any suitable fashion that enables loop drive system 100 to function as described herein.

In the exemplary embodiment, idler wheel 212 is positioned on base plate 122 relative to slot 120 and sized such that rim surface 216 engages drive loop 102 rising toward slot 120 as described above. That is, with reference to FIG. 8, idler wheel 212 is located circumferentially behind slot 120 such that drive loop 102 maintains substantially continuous contact and driving engagement with rim surface 216 as ascending side 111 ascends to tank 108. For example, in alternative embodiments, idler wheel 212 is spaced a greater distance circumferentially from slot 120 and rim surface 216 extends a greater distance downward along the Z-axis from base plate 122 to facilitate driving engagement between drive loop 102 and rim surface 216.

Although illustrated as including a single idler wheel 212, inlet seal 141, and slot 120, and therefore configured to receive a single drive loop 102 therethrough, in some embodiments, inlet housing 140 substantially as described above is used with loop drive system 100 having dual drive loops 102, 103 oriented in a double-helix relationship, as shown in FIG. 2. Specifically, in such embodiments, inlet housing 140 includes a second idler wheel (not shown) substantially identical to idler wheel 212 described above and in a spaced relationship to the second inlet seal 141 (shown in FIG. 3). In other words, in such embodiments, the second idler wheel is spaced approximately 180 degrees apart from the first idler wheel 212.

Exemplary embodiments of a buoyancy-enhanced helical loop drive system are described above in detail. The systems and methods are not limited to the specific embodiments described herein, but rather, components of systems and/or steps of methods may be utilized independently and separately from other components and/or steps described herein. For example, buoyancy-enhanced helical loop drive system may also be used in combination with other machines and methods, and is not limited to practice with solely a load coupled to one of the gears as described herein. Rather, the embodiments can be implemented and utilized in connection with many other applications.

Although specific features of various embodiments of the disclosure may be shown in some drawings and not in others, this is for convenience only. Moreover, references to "alternative embodiments" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A buoyancy-enhanced helical loop drive system comprising:
   an upper gear;
   a lower gear;

a stationary support structure configured to support said upper gear and said lower gear for rotation with respect to said stationary support structure;

a drive loop extending in a closed loop around said upper gear and said lower gear and rotatably engaging said upper gear and said lower gear, said drive loop comprising a plurality of sections coupled together serially and defining a helical shape, each of said plurality of sections extending from a male end to an opposite female end, said female end comprising an end face;

a tank configured to retain a liquid medium, said tank comprising a lower end and an opposite upper end, wherein an ascending side of said drive loop extends through said tank from said lower end to said upper end, and wherein said male end of each of said plurality of sections is configured to couple to said female end of an adjacent one of said plurality of sections in a face-to-face relationship, such that said adjacent sections are rotatable with respect to each other about an axis normal to said end face of said female end;

an inlet housing coupled to said lower end of said tank, said inlet housing is rotatable about a vertical axis with respect to said stationary support structure; and an intermediate plate coupled to said stationary support structure for bi-directional translation with respect to said stationary support structure, said intermediate plate is coupled to said inlet housing such that said inlet housing is rotatable about the vertical axis with respect to said intermediate plate.

2. The system according to claim 1, wherein said inlet housing comprises an inlet seal comprising an exit wall and an exit port defined in said exit wall, wherein the ascending side of said drive loop is receivable from beneath said inlet housing, through said inlet seal, through said exit port, and into said tank, wherein the ascending side of said drive loop advances through said exit port in an exit direction, and wherein said exit wall is oriented perpendicular to the exit direction.

3. The system according to claim 1, wherein said drive loop comprises a helix angle, and wherein said upper gear comprises a core comprising a plurality of teeth configured to successively engage each of said plurality of sections, said teeth are oriented with respect to an axis of rotation of said upper gear at a tooth angle that is substantially equal to said helix angle.

4. The system according to claim 1, wherein said male end comprises an end face and a pin, said pin comprises a pin end and a neck positioned between said end face of said male end and said pin end.

5. The system according to claim 4, wherein said female end further comprises:

a recess defined centrally in said female end; and an indent depending from said end face of said female end and transitioning into said recess, wherein said end face of said female end further comprises a neck holster portion partially covering said recess, and wherein said pin of said each section is slidable along said indent of said adjacent section such that said pin end is received in said recess and said neck engages said neck holster portion.

6. A buoyancy-enhanced helical loop drive system comprising:

an upper gear;

a lower gear;

a stationary support structure configured to support said upper gear and said lower gear for rotation with respect to said stationary support structure;

a drive loop extending in a closed loop around said upper gear and said lower gear and rotatably engaging said upper gear and said lower gear, said drive loop defining a helical shape;

a tank configured to retain a liquid medium, said tank comprising a lower end and an opposite upper end, wherein an ascending side of said drive loop extends through said tank from said lower end to said upper end; and an inlet housing coupled to said lower end of said tank, said inlet housing is rotatable about a vertical axis with respect to said stationary support structure, said inlet housing comprising an inlet seal, said inlet seal comprising an exit wall and an exit port defined in said exit wall, wherein the ascending side of said drive loop is receivable from beneath said inlet housing, through said inlet seal, through said exit port, and into said tank, wherein the ascending side of said drive loop advances through said exit port in an exit direction, and wherein said exit wall is oriented perpendicular to the exit direction.

7. The system according to claim 6, wherein said drive loop comprises a plurality of sections coupled together serially and defining the helical shape, each of said plurality of sections extending from a male end to an opposite female end, said female end comprising an end face, wherein said male end of each of said plurality of sections is configured to couple to said female end of an adjacent one of said plurality of sections in a face-to-face relationship, such that said adjacent sections are rotatable with respect to each other about an axis normal to said end face of said female end.

8. The system according to claim 7, wherein said drive loop comprises a helix angle, and wherein said upper gear comprises a core comprising a plurality of teeth configured to successively engage each of said plurality of sections, said teeth are oriented with respect to an axis of rotation of said upper gear at a tooth angle that is substantially equal to said helix angle.

9. The system according to claim 8, further comprising an intermediate plate coupled to said stationary support structure for bi-directional translation with respect to said stationary support structure, said intermediate plate is coupled to said inlet housing such that said inlet housing is rotatable about the vertical axis with respect to said intermediate plate.

10. The system according to claim 8, wherein said inlet housing further comprises a base plate comprising a slot defined therein, said inlet seal further comprises a perimeter coupled to said base plate such that said perimeter surrounds said slot, and such that an inlet seal chamber is defined between said inlet seal and said slot in flow communication with said slot.

11. The system according to claim 10, wherein said lower end of said tank is sealingly coupled to said base plate.

12. The system according to claim 8, wherein said lower end of said tank is sealingly coupled to said exit wall of said inlet seal.

13. A buoyancy-enhanced helical loop drive system comprising:

an upper gear;

a lower gear;

a stationary support structure configured to support said upper gear and said lower gear for rotation with respect to said stationary support structure;

a drive loop extending in a closed loop around said upper gear and said lower gear and rotatably engaging said upper gear and said lower gear, said drive loop defining a helical shape;

a tank configured to retain a liquid medium, said tank comprising a lower end and an opposite upper end, wherein an ascending side of said drive loop extends through said tank from said lower end to said upper end;

an inlet housing fixedly coupled to said lower end of said tank, said inlet housing is rotatable about a vertical axis with respect to said stationary support structure, said inlet housing comprising an inlet seal, wherein the ascending side of said drive loop is receivable from beneath said inlet housing, through said inlet seal, and into said tank; and an intermediate plate coupled to said stationary support structure for bi-directional translation with respect to said stationary support structure, said intermediate plate coupled to said inlet housing such that said inlet housing is rotatable about the vertical axis with respect to said intermediate plate.

14. The system according to claim 13, wherein said drive loop comprises a plurality of sections coupled together serially and defining the helical shape, each of said plurality of sections extending from a male end to an opposite female end, said female end comprising an end face, wherein said male end of each of said plurality of sections is configured to couple to said female end of an adjacent one of said plurality of sections in a face-to-face relationship, such that said adjacent sections are rotatable with respect to each other about an axis normal to said end face of said female end.

15. The system according to claim 14, wherein said drive loop comprises a helix angle, and wherein said upper gear comprises a core comprising a plurality of teeth configured to successively engage each of said plurality of sections, said teeth are oriented with respect to an axis of rotation of said upper gear at a tooth angle that is substantially equal to said helix angle.

16. The system according to claim 13, wherein said inlet seal comprises an exit wall and an exit port defined in said exit wall, wherein the ascending side of said drive loop is receivable from beneath said inlet housing, through said inlet seal, through said exit port, and into said tank, wherein the ascending side of said drive loop advances through said exit port in an exit direction, and wherein said exit wall is oriented perpendicular to the exit direction.

17. The system according to claim 13, wherein said inlet housing further comprising a base plate fixedly coupled to said lower end of said tank, said inlet seal further comprises a perimeter coupled to said base plate, wherein said intermediate plate is coupled to, and positioned beneath, said base plate such that said base plate is rotatable about the vertical axis with respect to said intermediate plate.

18. The system according to claim 13, wherein said stationary support structure comprises a static platform extending in a horizontal direction, said intermediate plate is coupled to said static platform via a drawer slide mechanism.

* * * * *